Aug. 30, 1949.   H. CRUZAN   2,480,120
OIL COOLER CONTROL

Filed June 9, 1944   2 Sheets-Sheet 1

Inventor
Harold Cruzan
By [signature]
Attorney

Aug. 30, 1949.
H. CRUZAN
2,480,120
OIL COOLER CONTROL
Filed June 9, 1944
2 Sheets-Sheet 2
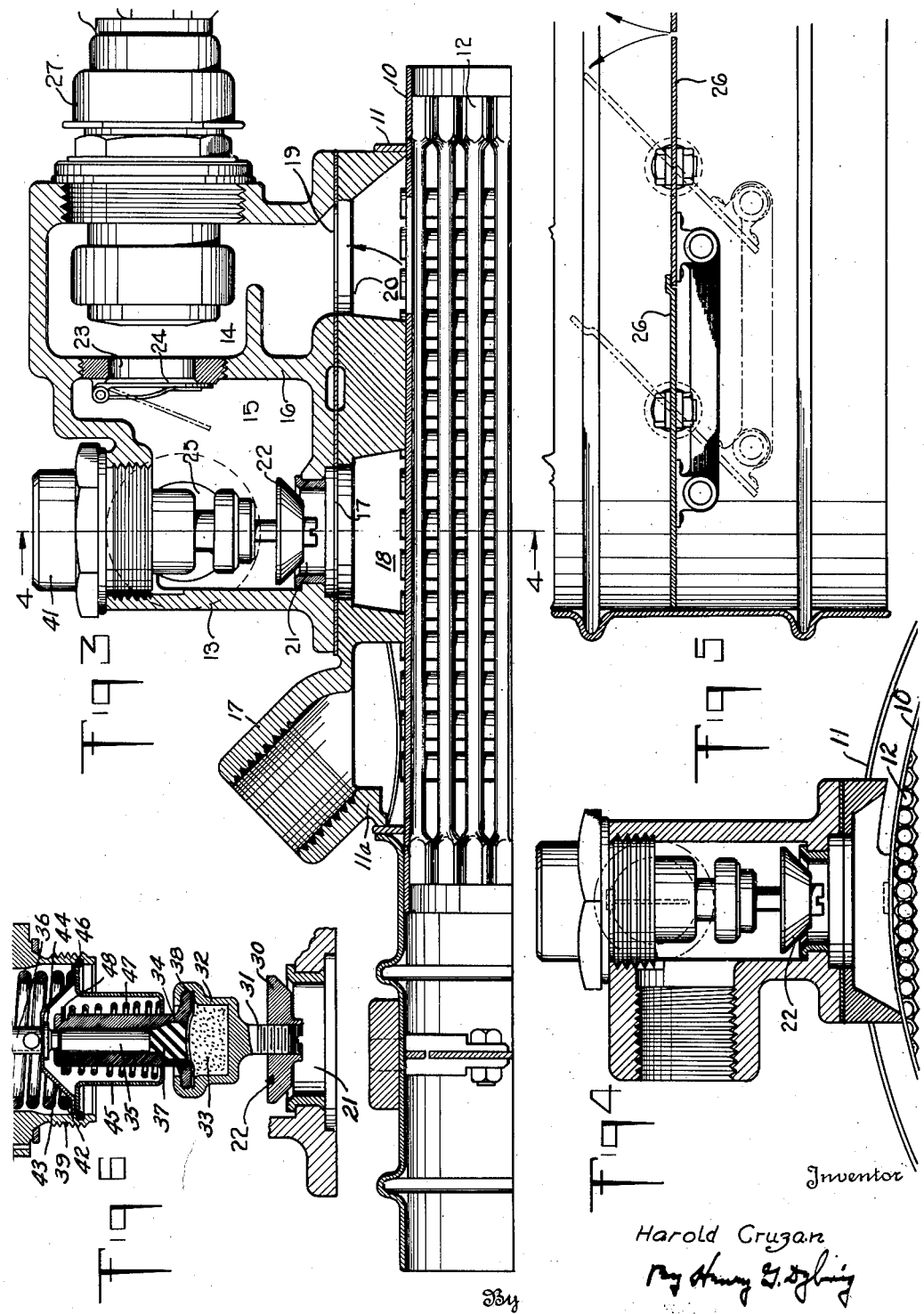
Inventor
Harold Cruzan Patented Aug. 30, 1949

2,480,120

UNITED STATES PATENT OFFICE 2,480,120

OIL COOLER CONTROL

Harold Cruzan, Los Angeles, Calif., assignor to United Aircraft Products, Inc., Dayton, Ohio, a corporation of Ohio Application June 9, 1944, Serial No. 539,565

2 Claims. (Cl. 257—2)

This invention relates to heat exchange units for use, for example, in the lubricant circulating systems of aircraft engines to cool the lubricant, and has particular reference to improvements in heat exchange units of the type including a core portion through which the lubricant normally flows and wherein it is cooled, and means for causing the lubricant to follow a path of flow through a passageway in by-passing relationship to said core portion whenever the latter becomes obstructed, as for example, when the lubricant therein becomes congealed during a period of idleness of the engine.

The invention further relates to heat exchange units of the type mentioned wherein shutters are employed to regulate flow of cooling air through the core portions of the units and wherein the shutters are actuated by thermal means operating in response to variations in the temperature of the lubricant flowing through the units.

In a heat exchange unit constructed in accordance with the invention there is a common outlet for the lubricant whether the lubricant flows through the core portion or the by-pass passageway of the unit, and in the path of flow of the lubricant from the core portion of the unit to said outlet is arranged the thermal means for actuating the shutters. In addition, a valve normally prevents flow of the lubricant through the by-pass passageway and thereby normally requires the lubricant to flow through the core portion of the unit, and said valve is maintained normally closed by yieldable means so that it may open under an abnormal pressure of the lubricant to permit by-pass flow of the lubricant.

Generally speaking, the object of the invention is to provide means whereby the thermal means for actuating the shutters is not affected by the heat of the lubricant flowing through the by-pass passageway of the unit and is affected only by the heat of the lubricant flowing to the outlet of the unit from the core portion thereof, thus to insure proper operation of the shutters at all times.

With the foregoing and other objects in view, which will become more fully apparent as the nature of the invention is better understood, the same consists in a heat exchange unit embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 3 is an enlarged longitudinal section through the top portion of the unit on the line 3—3 of Figure 1.

Figure 4 is a cross section on the line 4—4 of Fig. 3.

Figure 5 is an enlarged horizontal section on the line 5—5 of Figure 1; and

Figure 6 is a vertical section through the valve for controlling flow of the lubricant through the by-pass passageway of the unit.

Figure 2:
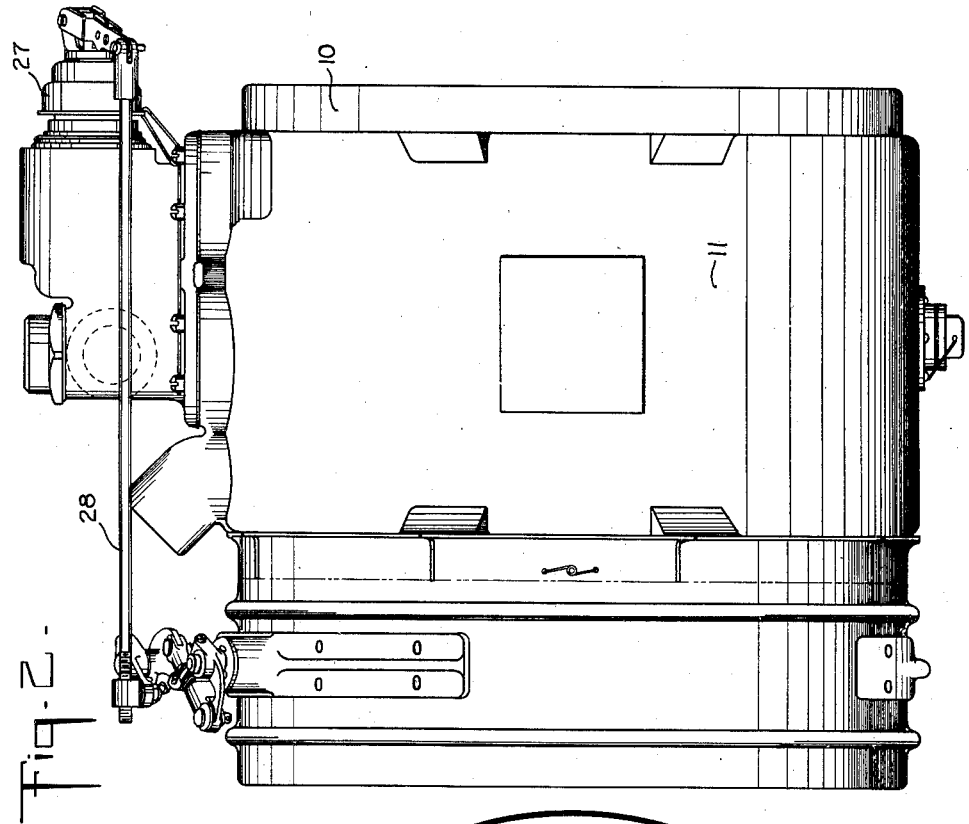
Figure 2 is a side elevation of the unit.
Figure 1:
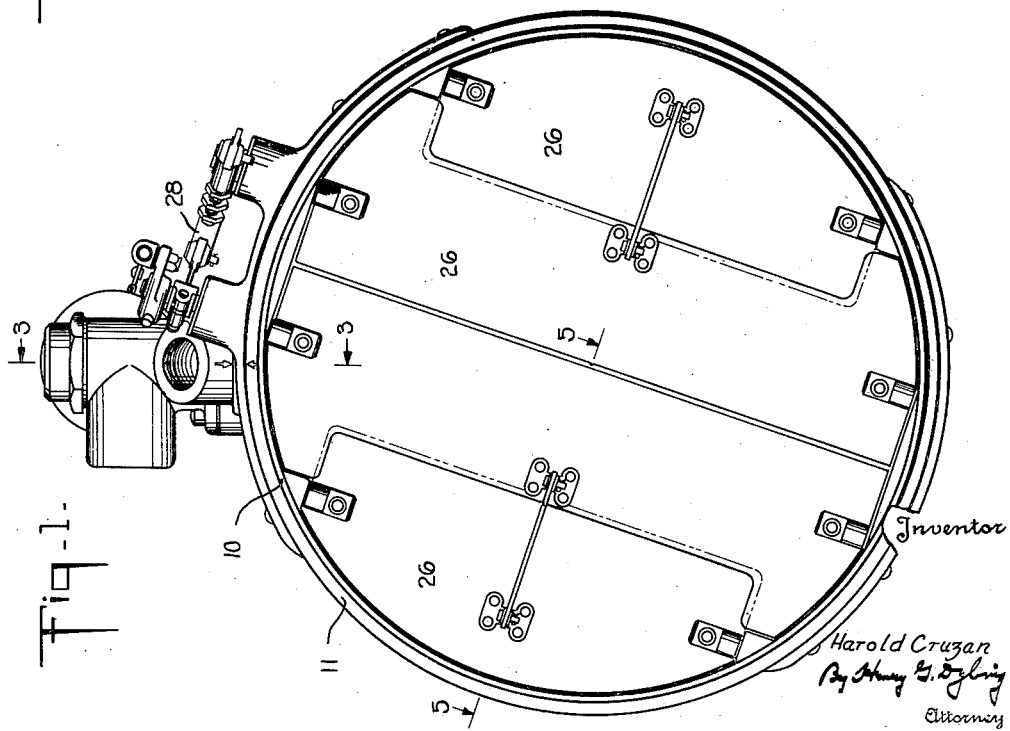
Figure 1 is an end elevation of a heat exchange unit constructed in accordance with the invention.

Referring to the drawings in detail, it will be observed that the present heat exchange unit is of a known type comprising an open-ended casing 10, a jacket 11 surrounding said casing in spaced relationship thereto, and a multiplicity of open-ended tubes 12 within and extending from end to end of said casing and substantially filling the same.

Between their ends the tubes 12 are laterally spaced apart, while at their ends they are exteriorly soldered or otherwise suitably connected to one another and to the casing 10 whereby the spaces between them are closed at their ends.

Suitably mounted upon a fitting 11a at the top of the jacket 11 at the top thereof is a housing 13 which is divided into a pair of chambers 14 and 15 by a vertical partition wall 16. The fitting 11a has a lubricant inlet opening 17 in communication with the annular passageway 18 around the casing 10 formed by the jacket 11.

In the bottom of the housing 13 and in the top of the fitting 11a are communicating openings 19 and 20, respectively, which afford communication between the interior of said casing 10 and the chamber 14 of said housing 13, while also in the bottom of said housing 13 is a port 21 which affords communication between the annular passageway 18 and the chamber 15 of said housing 13 under the control of a valve designated generally as 22.

The valve 22, with respect to which no novelty per se is claimed, may be of any suitable type such that it is yieldably closed and is maintained closed, or substantially closed, against the normal pressure of the lubricant in the system of which the heat exchange unit is a part, but may open under a surging or abnormal pressure of lubricant. In the illustrated instance, the valve comprises a closure element 30 constructed and arranged to seat in the port 21. The element 30 is carried upon a stem 31 of a case 32 containing a quantity of an amorphous material 33 having the property of expansion under heat. Connected to the case 32 and extending therefrom in a direction opposed to the stem 31 is a bushing 34. Within the bushing 34 is a plunger 35 extending at its outer end against a floating stop 36. The inner end of plunger 35 engages a rubber pellet 37 which overlies the amorphous material 33 in case 32, being separated therefrom by a diaphragm 38 clamped between the adjacent ends of the case 32 and the bushing 34. The valve unit assembly further comprises a housing 39 in surrounding relation to the upper end of bushing 34 and screw threaded into the body 13. A cap 41 closes the housing 39 and confines a coil spring 42 therein. The free end of the spring 42 bears upon a disc 43 which surrounds the stop 36 in overlying relation to a flange 44 thereon, the spring 42 thus providing a yielding base for the stop 36. The disc 43 rests upon the outturned end of a cup shaped spring housing 45 surrounding bushing 34 and held in housing 39 by a lock ring 46. A spring 47 in housing 45 seats on the bottom thereof and engages a clip 48 on bushing 34 in such wise as to urge the assembly of parts including bushing 34, case 32, and valve 30 outward or away from port 21. Such motion is resisted by the more powerful spring 42 which holds the parts normally extended in the manner indicated. The spring 47 is effective, however, to compress the thermostatic material 33 by forcing the material against the rubber pellet 37 and plunger 35 which are held against outward motion by the stop 36. Sufficient relative motion of the plunger 35 and case 32 is permitted to raise valve element 30 normally to an open position with respect to port 21.

As the temperature of the oil in contact with case 32 rises, the material 33 therein expands. In so doing, the material tends to thrust plunger 35 out of bushing 34. Such action is prevented by stop 36 however, so that the force of expansion is resolved into an inward or downward motion of bushing 34 and case 32 tending to seat valve element 30 in port 21. Such motion is accomplished against the urging of spring 47, thereby building up a force in that spring effective to open the valve and to recompress the material 33 in response to a lowering oil temperature. The resilient mounting of the valve and thermostatic assembly, provided by the spring 42, is utilized to permit a bodily shifting of the assembly to open port 21 under the influence of a predetermined pressure differential across closure element 30, irrespective of the temperature of the oil surrounding case 32.

In the partition wall 16 is a port 23 which affords communication between the chambers 14 and 15, under the control of a suitable check valve 24 which opens toward the chamber 15 and closes toward the chamber 14, while in a wall of the chamber 15 is an opening 25 for outlet of lubricant from the unit regardless of whether the outlet flow of the lubricant is via the chamber 14 or the chamber 15.

In accordance with known practice, the annular passageway 18 is in communication with the interior of the casing 10 at the bottom of said casing. Accordingly, since the valve 22 normally is closed, the normal path of flow of the lubricant is from the inlet opening 17 to the annular passageway 18, around said annular passageway to the bottom of the casing 10, upwardly through the maze of narrow spaces in said casing between the tubes 12 therein where it is cooled by air flowing through said tubes, through the openings 20 and 19 into the chamber 14, from said chamber 14 through the port 23 in the partition wall 16 into the chamber 15 and from the unit through the outlet opening 25.

Should the lubricant in the casing 10 become congealed and thereby obstruct flow through said casing, the pressure of the lubricant will rise and thereby the yieldably closed valve 22 will be forced open, with the result that the lubricant then will flow in by-passing relationship to the casing 10 from the inlet opening 17 to the annular passageway 18, from said annular passageway through the port 21 directly into the chamber 15 in by-passing relationship to the chamber 14 which it is prevented from entering by the check valve 24, and from said chamber 15 through the outlet opening 25.

Shutters 26 are suitably mounted at one end of the casing 10 for regulating flow of cooling air through the tubes 12, and in accordance with the invention a suitably thermally operably power device, designated generally as 27, is mounted for operation in response to changes in the temperature of the lubricant flowing through the chamber 14, and is suitably connected to the shutters 26, as indicated generally at 28, so that the shutters are opened and closed in response to increase and decrease, respectively, in the temperature of the lubricant as it follows its normal path of flow through the unit. Thus, as long as the lubricant is following its normal path of flow through the unit it may be maintained at, or substantially at, a desired temperature. If, however, it is flowing in by-passing relationship to the heat exchange portion of the unit, it is prevented by the check valve 24 from entering the chamber 14 and thereby affecting the power device 27, so that the shutters 26 will not be undesirably opened even though the by-passing lubricant may be hot. In other words, the shutters completely close when the lubricant in the casing 10 becomes congealed and it is undesirable that said shutters shall open until the lubricant in said casing 10 has been de-congealed and normal circulation of the lubricant through the casing 10 has been resumed. If hot lubricant flowing in by-passing relationship to the casing 10 could affect the power device 27 the shutters might be undesirably opened when the lubricant in said casing is congealed, but because of the arrangement whereby the by-passing lubricant cannot affect said power device 27 the shutters remain closed until normal flow of the lubricant through the casing 10 is resumed.

From the foregoing description, considered in connection with the accompanying drawings, it is believed that the novel features and the advantages of the invention will be clearly understood and appreciated. It is desired to point out, however, that while only a single, specific embodiment of the invention has been illustrated and described, the same is readily capable of embodiment in specifically different mechanical structures within its spirit and scope as defined in the appended claims.

I claim:

1. Fluid conditioning apparatus comprising a heat exchange unit, an inlet to said unit for a first fluid which is congealable, primary and secondary passages through said unit for said first fluid, said first fluid and a second fluid passing in heat exchange relation in said primary passage, said secondary passage constituting a by-pass, an outlet from said heat exchange unit common to said primary and secondary passages, said secondary passage communicating directly with said outlet, a flapper valve between said primary passage and said outlet inhibiting reverse flow from said secondary passage to said primary passage, a valve controlling flow from said secondary passage, a thermostat adjacent said outlet and exposed to the flows from said primary and secondary passages for controlling said valve, a yield incorporated in said thermostat permitting said valve to open in response to increased pressure of said first fluid as may result from congelation in said primary passage to permit by-passing flow through said secondary passage, and means responsive to a changing condition of said first fluid and interposed in the path of said first fluid at the terminus of said primary passage in advance of said flapper valve for controlling flow of said second fluid.

2. Fluid conditioning apparatus, comprising a heat exchange unit, an inlet to said unit for a first fluid which is congealable, primary and secondary passages through said unit for said first fluid, said first fluid and a second fluid passing in heat exchange relation in said primary passage, said secondary passage constituting a by-pass, a valve housing on said heat exchange unit, means in said housing defining first and second chambers serving respectively as the terminals of said primary and secondary passages, pressure and temperature responsive means for regulating flow into said second chamber from said secondary passage, said means including a thermostat in said second chamber, an outlet from said second chamber, a port between said first and second chambers whereby oil entering said first chamber from said primary passage is constrained to reach said outlet by passage through said second chamber, a flapper valve controlling flow through said port and inhibiting reverse flow from said second chamber to said first chamber, and means responsive to changing temperature of said first fluid within said first chamber for controlling flow of said second fluid.

HAROLD CRUZAN.

REFERENCES CITED

The following references are of record in the file of this patent:

UNITED STATES PATENTS

| Number | Name | Date |
|---|---|---|
| D. 135,682 | Geddes | May 11, 1943 |
| 1,913,680 | McCray | June 13, 1933 |
| 2,291,637 | Kohlmann | Aug. 4, 1942 |
| 2,348,212 | Gill | May 9, 1944 |
| 2,354,362 | Burns | July 25, 1944 |
| 2,368,182 | Vernet | Jan. 30, 1945 |

FOREIGN PATENTS

| Number | Country | Date |
|---|---|---|
| 846,300 | France | June 5, 1939 |